(12) United States Patent
Zhu et al.

(10) Patent No.: US 8,289,144 B2
(45) Date of Patent: Oct. 16, 2012

(54) TIRE PARAMETER MONITORING SYSTEM WITH SENSOR LOCATION USING RFID TAGS

(75) Inventors: Shengbo Zhu, San Jose, CA (US); Su Shiong Huarg, Bellevue, WA (US)

(73) Assignee: Silicon Valley Micro C Corp., San Jose, CA (US)

( * ) Notice: Subject to any disclaimer, the term of this patent is extended or adjusted under 35 U.S.C. 154(b) by 833 days.

(21) Appl. No.: 12/315,139

(22) Filed: Nov. 28, 2008

(65) Prior Publication Data

US 2010/0134269 A1    Jun. 3, 2010

(51) Int. Cl.
*B60C 23/00* (2006.01)
*B60C 23/02* (2006.01)

(52) U.S. Cl. .................. 340/447; 340/442

(58) Field of Classification Search .......... 340/442, 340/447
See application file for complete search history.

(56) References Cited

U.S. PATENT DOCUMENTS

| | | | |
|---|---|---|---|
| 6,441,728 B1* | 8/2002 | Dixit et al. | 340/447 |
| 6,535,136 B1* | 3/2003 | Rodenbeck et al. | 340/686.6 |
| 2002/0190853 A1* | 12/2002 | Nigon et al. | 340/448 |
| 2004/0100100 A1* | 5/2004 | Wilson | 290/1 R |
| 2005/0258951 A1* | 11/2005 | Lin | 340/447 |
| 2007/0135179 A1* | 6/2007 | Hardman et al. | 455/574 |
| 2009/0072800 A1* | 3/2009 | Ramadass et al. | 323/271 |
| 2009/0224899 A1* | 9/2009 | Wieser | 340/444 |

* cited by examiner

*Primary Examiner* — Benjamin C Lee
*Assistant Examiner* — Cal Eustaquio (57) ABSTRACT

A tire parameter monitoring system has a plurality of sensor units for monitoring tire parameters, with each sensor unit mounted with a different vehicle tire. Each sensor unit has an RFID tag reader for interrogating an RFID tag securely mounted to the vehicle adjacent the corresponding tire and containing a unique identification code. Each sensor unit has a microcontroller for combining each RFID identification code with corresponding tire parameter signals, and a transmitter for transmitting the combined signals to a receiving location. Received tire parameter signals are correlated with the tire location using the RFID identification code, and driver advisory signals are presented to the driver by a display/alarm unit. Two alternative power supplies are provided. A first type uses a battery and a power management circuit for eliminating power drain when the RFID tag reader is energized. A second type uses inductive power to provide an inexhaustible power source.

11 Claims, 6 Drawing Sheets

TIRE PARAMETER MONITORING SYSTEM WITH SENSOR LOCATION USING RFID TAGS

BACKGROUND OF THE INVENTION

This invention relates to vehicle tire parameter monitoring systems. More particularly, this invention relates to a tire parameter monitoring system having a sensor unit position location feature using RFID tags.

Tire parameter monitoring systems are known and are commonly used to monitor one or more parameters of interest in individual pneumatic tires of a vehicle and to provide an advisory signal to the driver, usually via an on-board computer system, containing information about the tire parameter(s). The portion of the tire parameter monitoring system located at or in the individual tires is termed the sensor unit, and includes one or more sensors capable of measuring the parameter(s) of interest and generating an electrical signal representative of the value of the measurement, a signal generator (typically an r.f. signal generator) capable of generating a wireless signal corresponding to the electrical signal, a microcontroller (such as a microprocessor or a digital signal processor) and a power source. Electrical power to the sensor circuitry is usually provided by a battery, which must be replaced (if possible) when the available battery power drops below a useful level. In some known systems, the battery cannot be replaced so that the entire sensor assembly must be replaced when the battery has reached the end of its useful lifetime. A tire parameter sensor system which monitors internal tire pressure is disclosed in commonly assigned, U.S. Pat. No. 6,959,594 issued Nov. 1, 2005 for "External Mount Tire Pressure Sensor System", the disclosure of which is hereby incorporated by reference. A tire pressure monitoring system which incorporates a power saving unit providing extended useful battery life is disclosed in commonly assigned, U.S. Pat. No. 7,222,523 issued May 29, 2007 for "Tire Pressure Sensor System With Improved Sensitivity And Power Saving", the disclosure of which is hereby incorporated by reference. A tire parameter monitoring system which eliminates the usual battery is disclosed in commonly-assigned, U.S. Pat. No. 7,363,806 issued Apr. 29, 2008 for "Tire Parameter Monitoring System With Inductive Power Source", the disclosure of which is hereby incorporated by reference.

The advisory signal produced by the sensor unit may indicate (a) whether a given parameter in the associated vehicle tire has a current value lying within or outside of a predetermined safe range, (b) the measured value of the parameter, or (c) some other tire parameter information of interest. Examples of common tire parameters are internal tire pressure, tire temperature, internal tire air temperature, and lateral tire force. In some cases, the parameter may be related to the condition of the wheel on which the tire is mounted, such as the angular moment of the wheel, concentricity or the like.

The advisory signal is typically generated by the r.f. signal generator controlled by the microprocessor connected to the tire parameter sensor, the advisory signal being generated in accordance with the system design characteristics: i.e., whether the system uses the range indicator value (in range/outside range), the measured value, or the other information of interest. This r.f. signal is transmitted to a vehicle-mounted receiver, which uses the advisory signal to alert the driver either visually (by activating a warning lamp or display) or audibly (by activating an audible alarm) or both. Alternatively, or in addition, the receiver may use the advisory signal for some other system purpose, such as to activate a vehicle control system, such as braking control, suspension control, and the like; to store the parameter data for future analysis; or for any other desired purpose.

In order to provide an operable system, it is necessary to correlate the advisory signals received by the vehicle-mounted receiver with the physical location on the vehicle of the tire whose parameter condition is specified by a given advisory signal. In the past, various techniques have been devised for this purpose. A common technique is the inclusion of an identification signal along with the parameter condition in a given advisory signal: the identification signal is unique to the sensor unit which generates the parameter condition. This unique identification signal is initially correlated to tire location on the vehicle by a technician having the required skill and training to operate the system in an initial training mode. Once each sensor unit has been initially correlated to its physical location on the vehicle, any advisory signal generated by a given sensor unit and received by the vehicle-mounted receiver can be uniquely identified with the location of the tire whose parameter condition is specified by the advisory signal.

A disadvantage with this type of location correlation technique is that any change to the original tire and sensor unit location requires that the system be re-correlated. For example, if the vehicle tires are relocated to different positions in the normal course of vehicle servicing, the physical locations of the sensor units will change if the sensor units are fixed to the tires or the wheels on which the tires are mounted (which is typical), and each individual sensor unit must be re-correlated to the physical location of the associated tire. The same is true (a) when a spare tire is exchanged for a flat tire on the vehicle; (b) when one or more new tires are installed on the vehicle wheels and mounted on the vehicle; and (c) when a new sensor unit is installed in place of a unit which stops functioning properly. As noted above, re-correlation requires the efforts of someone having the required skill and training to operate the system in a training mode. While some vehicle owners may be capable of acquiring the necessary skill and training, others may not. The latter will necessarily suffer delay and expense when re-configuring the vehicle tires and wheels; the former will suffer at least the delay attendant upon re-familiarizing oneself with the steps required to re-program an electronic system.

A variation of this type of sensor unit correlation system uses a manually actuatable transmitter installed in the valve stem of a tire. The transmitter is actuated by inserting a small object into the valve stem a sufficient axial distance to operate a switch, which causes the transmitter to send an appropriate signal to a vehicle-mounted receiver capable of correlating the signal from the operating transmitter to the tire to which the transmitter is attached. An example of this type of system is disclosed in U.S. Pat. No. 6,998,975 B2 issued Feb. 14, 2006, the disclosure of which is hereby incorporated by reference. This system requires some provision for ensuring that any change to the original sensor unit/tire location configuration will cause a re-correlation of the sensor units with the new configuration.

Another common technique used to correlate the advisory signals received by the vehicle-mounted receiver with the physical location on the vehicle of the tire whose parameter condition is specified by a given advisory signal incorporates a special multiple antenna interrogator system connected to a vehicle-mounted controller and a complementary set of sensor units. Each antenna is connected to the controller in such a way that only one antenna is actively coupled to the controller during any given interrogation interval. Each antenna is located adjacent a different associated one of the sensor units in sufficiently close proximity that an interrogation signal generated by a given antenna is operatively coupled essentially only to the associated sensor unit. Each sensor unit has a circuit responsive to an interrogation signal from the associated antenna to initiate a parameter signal transmission sequence during which the value measured by a sensor is transmitted to a receiver located in the vehicle-mounted controller, where it is processed. Since the location of each individual interrogation antenna is fixed, it can be permanently correlated to a wheel location. Therefore, when the controller activates a given interrogation antenna, the subsequently received parameter signal is automatically correlated with the correct tire location. Examples of this type of unit are disclosed in U.S. Patent Application Publication No. US 2003/0145650 A1 published Aug. 7, 2003; and U.S. Pat. No. 6,838,985 B2, the disclosures of which are hereby incorporated by reference.

A disadvantage to the interrogator antenna system described above lies in the requirement for the installation of the separate interrogation antennae adjacent the tire parameter sensor units. The necessary electrical cabling must be routed between the controller and the individual antennae. This imposes a requirement of careful routing of the cables to avoid mechanical abrasion, electrical interference, and thermal stresses over time. As a consequence, installation cost and hardware durability are factors of concern when deciding to implement such a system.

Another technique used to correlate the advisory signals received by the vehicle-mounted receiver with the physical location on the vehicle of the tire whose parameter condition is specified by a given advisory signal is disclosed in commonly assigned co-pending patent application Ser. No. 11/893,803 filed Aug. 18, 2007 for "Tire Parameter Monitoring System With Sensor Location Using Magnetic Fields", the disclosure of which is hereby incorporated by reference. This technique employs a plurality of sets of permanent magnets permanently attached to the vehicle adjacent the wheel locations. Each set of magnets has a unique magnetic polarity configuration so that the compound magnetic field generated by each set is also unique. These unique compound magnetic fields serve to identify the location on the vehicle of the wheel/tire assemblies. Each wheel/tire assembly has a sensor with a magnetic field sensing element, such as a coil, capable of generating an electrical signal corresponding to the unique magnetic field generated by the adjacent set of magnets as the wheel/tire assembly rotates relative to the magnet set. This electrical signal is combined by the sensor unit with the measured tire parameter signals and transmitted to the controller on board the vehicle whenever the sensor unit is interrogated by the controller, so that the tire parameter signals are correlated to the magnetic field signals and thus the location on the vehicle at which the transmitting sensor unit is located. While this arrangement requires an initial routine for correlating the unique magnetic field signals with vehicle location, once the correlation has been done the tire parameter signals are automatically correlated with vehicle position of the transmitting sensor unit. Thus, rotating the wheel/tire assemblies on the vehicle, or replacing a sensor unit with a different sensor unit, does not affect the automatic correlation of transmitted tire parameter signals with vehicle position.

While highly effective, the functioning of the magnetic field arrangement described above can be impaired in highly ferro-magnetic environments, which can distort the magnetic fields. Although this is not a problem in many applications, in others better results are desirable.

Efforts to provide a simple, inexpensive, reliable, and accurate sensor unit location feature for a tire parameter sensing system devoid of the above-noted disadvantages have not been successful to date.

SUMMARY OF THE INVENTION

The invention comprises a method and system for providing sensor unit location information using permanently mounted RFID tags mounted adjacent tire locations on a vehicle, which is simple and inexpensive to implement, highly reliable, and accurate.

From an apparatus standpoint, the invention comprises a sensor unit for use with a vehicle mounted tire parameter monitoring system having at least one tire parameter sensor, the sensor unit comprising an RFID tag reader for sensing RFID tag identification signals generated by an associated RFID tag mounted on the vehicle adjacent the associated sensor unit, the RFID tag identification signals being generated in response to an interrogation by the associated RFID tag reader; a microcontroller coupled to the RFID tag reader for enabling the RFID tag reader to perform an interrogation of the associated RFID tag and for receiving and processing the RFID tag identification signals and tire parameter signals from an associated tire parameter sensor; and a signal generator controlled by the microcontroller for transmitting the processed RFID tag identification signals and the tire parameter signals to a receiving location.

The sensor unit further includes a power source for supplying electrical power to the microcontroller, the signal generator, and the RFID tag reader. A first source type has a battery coupled directly to the microcontroller and the signal generator, and a power management circuit selectively coupled to the battery and the RFID tag reader for storing electrical charges from the battery during a quiescent RFID tag reader operating period and for supplying the stored charges to a power input of the RFID tag reader during an active operating period thereof.

The power management circuit preferably includes a capacitor having a charge carrying plate, and a switch means having a power input terminal coupled to the battery, a power output terminal coupled to a power input terminal of the RFID tag reader, and a control input terminal coupled to and controlled by the microcontroller for configuring the switch in at least a first operational position in which the battery is connected to the charge carrying plate, and a second operational position in which the charge carrying plate is connected to the power input terminal of the RFID tag reader to supply electrical operating power thereto.

Alternatively, a second power source type comprises an inductive power source for supplying electrical power to the RFID tag reader, the microcontroller, and the signal generator, the inductive power source preferably including a power coil and a power system having an input terminal coupled to the coil and an output terminal coupled to the RFID tag reader, the microcontroller, and the signal generator. This alternative arrangement provides an inexhaustible supply of electrical power to the sensor unit.

The sensor unit preferably includes at least one tire parameter sensor having an output coupled to the microcontroller for supplying tire parameter signals thereto.

From a system standpoint, the invention comprises a tire parameter monitoring system for monitoring the current values of tire parameters of tires mounted on a vehicle, the system comprising a plurality of sensor units each associated to a different tire on the vehicle. Each sensor unit includes an RFID tag reader for sensing RFID tag identification signals generated by an associated RFID tag mounted on the vehicle adjacent the associated sensor unit, the RFID tag identification signals being generated in response to an interrogation by the associated RFID tag reader; a microcontroller coupled to the RFID tag reader for receiving and processing the RFID tag identification signals and tire parameter signals from an associated tire parameter sensor; and a signal generator controlled by the microcontroller for transmitting the processed location signals and the tire parameter signals to a receiving location; and a plurality of RFID tags each having a unique identification code stored therein for generating a plurality of different identification codes each specifying the unique location on the vehicle of the corresponding RFID tag, each RFID tag being located in proximity to a different one of the plurality of sensor units.

Each sensor unit includes a power source for supplying electrical power to the microcontroller, the signal generator and the RFID tag reader. A first type of power source comprises a battery coupled directly to the microcontroller and the signal generator; and a power management circuit selectively coupled to the battery and the RFID tag reader for storing electrical charges from the battery during a quiescent RFID tag reader operating period and for supplying the stored charges to a power input of the RFID tag reader during an active operating period thereof. Each power management circuit includes a capacitor having a charge carrying plate, and a switch means having a power input terminal coupled to the battery, a power output terminal coupled to a power input terminal of the RFID tag reader, and a control input terminal coupled to and controlled by the microcontroller for configuring the switch in at least a first operational position in which the battery is connected to the charge carrying plate, and a second operational position in which the charge carrying plate is connected to the power input terminal of the RFID tag reader to supply electrical operating power thereto.

Alternatively, each sensor unit is power by a second power source type which comprises an inductive power source for supplying electrical power to the RFID tag reader, the microcontroller, and the signal generator. The inductive power source preferably includes a power coil and a power system having an input terminal coupled to the coil and an output terminal coupled to the RFID tag reader, the microcontroller, and the signal generator.

Each sensor unit further includes at least one tire parameter sensor having an output for coupling signals representing measured tire parameter values to the microcontroller for processing and transmission to an on-board receiver site.

The system further includes a receiver/processor for receiving and processing the RFID identification signals and tire parameter signals from the sensor units, and displaying the results on an operator display/audible alarm unit.

From a process standpoint, the invention comprises a method of correlating tire parameter signals generated by sensor units associated to different ones of a plurality of tires on a vehicle with the location of tires whose parameters are monitored by the sensor units, the method comprising the steps of:

(a) generating a plurality of different RFID tag signals in proximity to the sensor units, each different RFID tag signal being associated to a different tire location on the vehicle;

(b) combining each RFID tag signal with the tire parameter signals from the sensor unit at the location specified by the RFID tag signal, and (c) transmitting the signals combined in step (b) to a receiving location.

The method step (a) of generating preferably includes the step of interrogating an RFID tag with an RFID tag reader located in the sensor unit; and the step of processing the signals transmitted in step (c) at the receiving location.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
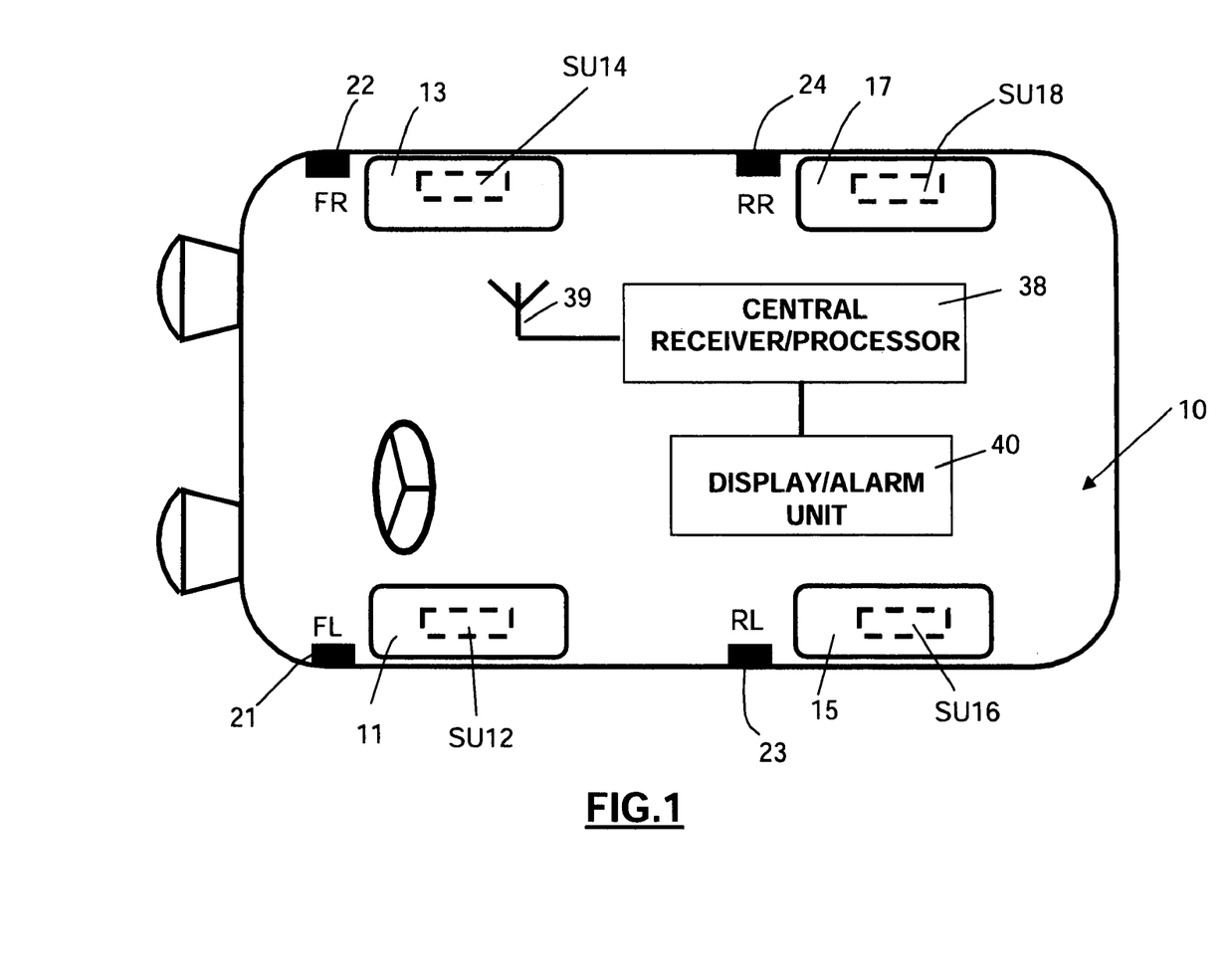
FIG. 1 is a schematic top plan view of a vehicle having a tire parameter sensing system incorporating the sensor unit location feature of the invention.

Turning now to the drawings, FIG. 1 is a schematic top plan view of a vehicle 10 having a tire parameter sensing system incorporating the sensor unit location feature of the invention. As seen in this Fig., which illustrates a vehicle having four tires and wheels, each tire has an associated tire parameter sensor unit SU illustrated with broken lines. Thus, left front tire 11 is provided with SU 12; right front tire 13 is provided with SU 14; left rear tire 15 is provided with SU 16; and right rear tire 17 is provided with SU 18. As described more fully below in connection with FIG. 2, each SU 12, 14, 16, and 18 has one or more tire parameter sensors for monitoring the state of individual tire parameters, such as internal tire pressure, tire temperature, internal tire air temperature, and lateral tire force. Such sensors are well known in the art and will not be described further to avoid prolixity. The physical location of the individual SUs 12, 14, 16, and 18 is a matter of design choice and may include the outer side wall of the associated tire, the inner side wall of the tire, within the tire carcass at an appropriate location (such as within the inner side wall of the tire or within the tread wall of the tire), or on the wheel hub.

Mounted on the vehicle adjacent each SU 12, 14, 16, and 18 is an RFID tag having a unique identification code. Thus, RFID tag 21 is physically located adjacent left front sensor unit SU 12; RFID tag 22 is physically located adjacent right front sensor unit SU 14; RFID tag 23 is physically located adjacent left rear sensor unit SU 16; and RFID tag 24 is physically located adjacent right rear sensor unit SU 18. Each RFID tag is located at a distance from its corresponding sensor unit which is within the reading range of the corresponding sensor unit. In the preferred embodiment, which incorporates a type RI-TRP-R9QL disk transponder available from Texas Instruments Incorporated, the reading range is typically 60 cm., which provides ample spacing between the RFID tags and their corresponding sensor units.

Figure 2:
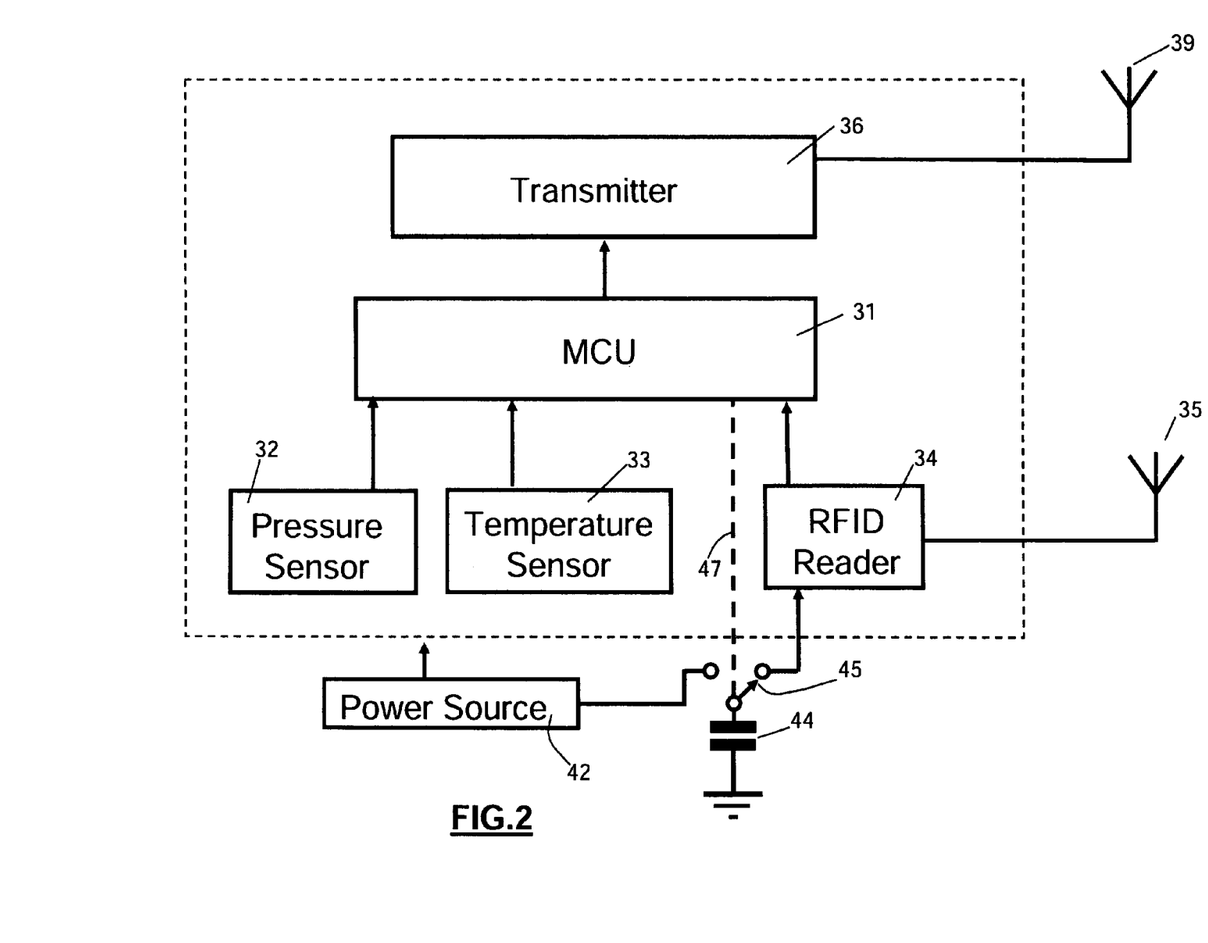
FIG. 2 is a schematic block diagram of a first embodiment of a sensor unit having a battery power source.

With reference to FIG. 2., which is a schematic block diagram of a first embodiment of a sensor unit having a battery power source, each sensor unit SU 12, 14, 16, and 18 incorporates a microcontroller unit 31 for processing sensor signals from one or more tire parameter sensors, such as tire pressure sensor 32 and tire internal temperature sensor 33. Microcontroller unit 31 also controls the operation of an RFID tag reader 34 and an r.f. transmitter unit 36. RFID reader 34 interrogates the associated RFID tag reader via an antenna 35 and supplies the RFID tag identification code to microcontroller unit 31 when directed to by microcontroller 31. RFID reader is preferably a type RI-RFM-003B mini radio frequency module available from Texas Instruments Incorporated or the equivalent. Microcontroller unit 31 may comprise any one of a number of known units, such as a commercially available Freescale type MC68HC908RF2 unit or the equivalent, having a transmitter section for generating r.f. information signals containing tire parameter measurement results and RFID tag identification signals, and a microcomputer for supervising and controlling the operation of RFID tag reader 34 and the transmitter section and for sensing the RFID tag identification codes and the sensor output signals and converting these sampled signals to measurement data to be supplied to the transmitter section. At appropriate time intervals, microcontroller 31 operates transmitter 36 to cause the transmission of tire parameter advisory signals and RFID tag identification signals to a central receiver/processor 38 (shown in FIG. 1) via an antenna 37. Central receiver/processor 38 receives these signal via an antenna 39 and uses the RFID tag identification signals to associate the tire parameter advisory signals with the correct tire, and converts the tire parameter advisory signals into driving signals for a display/alarm unit 40 of conventional design, in which the parameter states can be displayed for the user and in which audible alarm signals can be generated to alert the driver of a dangerous tire condition.

In the embodiment of FIG. 2, power to the microcontroller unit 31, sensors 32, 33, RFID reader 34, and transmitter 36 is supplied by a battery power source 42. Since RFID reader 34 consumes a relatively large amount of electrical power when activated (e.g., approximately 1 amp.@5V. for a typical RFID tag reader), a storage capacitor 44 and switch 45 are included in the FIG. 2 embodiment. Switch 45 can be alternately connected between the power output of power source 42 and one plate of capacitor 44; and between the power input terminal of RFID reader 34 and the same plate of capacitor 44. When connected to the power source 42, capacitor 44 charges at an acceptably slow rate so as not to place a heavy quick drain on power source 42, which could shorten the lifetime of the battery. When connected to the power input of RFID reader 34, the charge on the upper plate of capacitor 45 quickly drains into RFID reader 34 to provide operating power thereto. With this arrangement, the life of the battery in power source 42 is extended over an arrangement lacking the capacitor 44 and switch 45. As suggested by broken line 47, the state of switch 45 is controlled by microcontroller 31.

Figure 3:
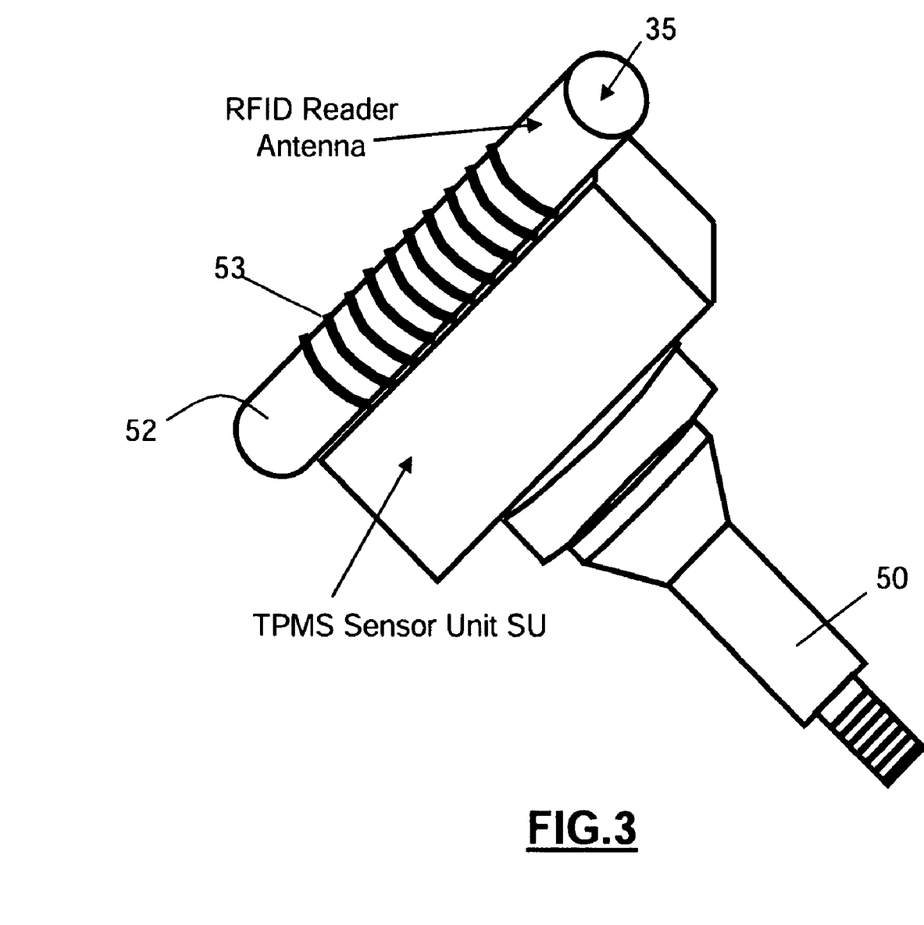
FIG. 3 is a perspective view showing a sensor unit and RFID reader antenna.
Figure 4:
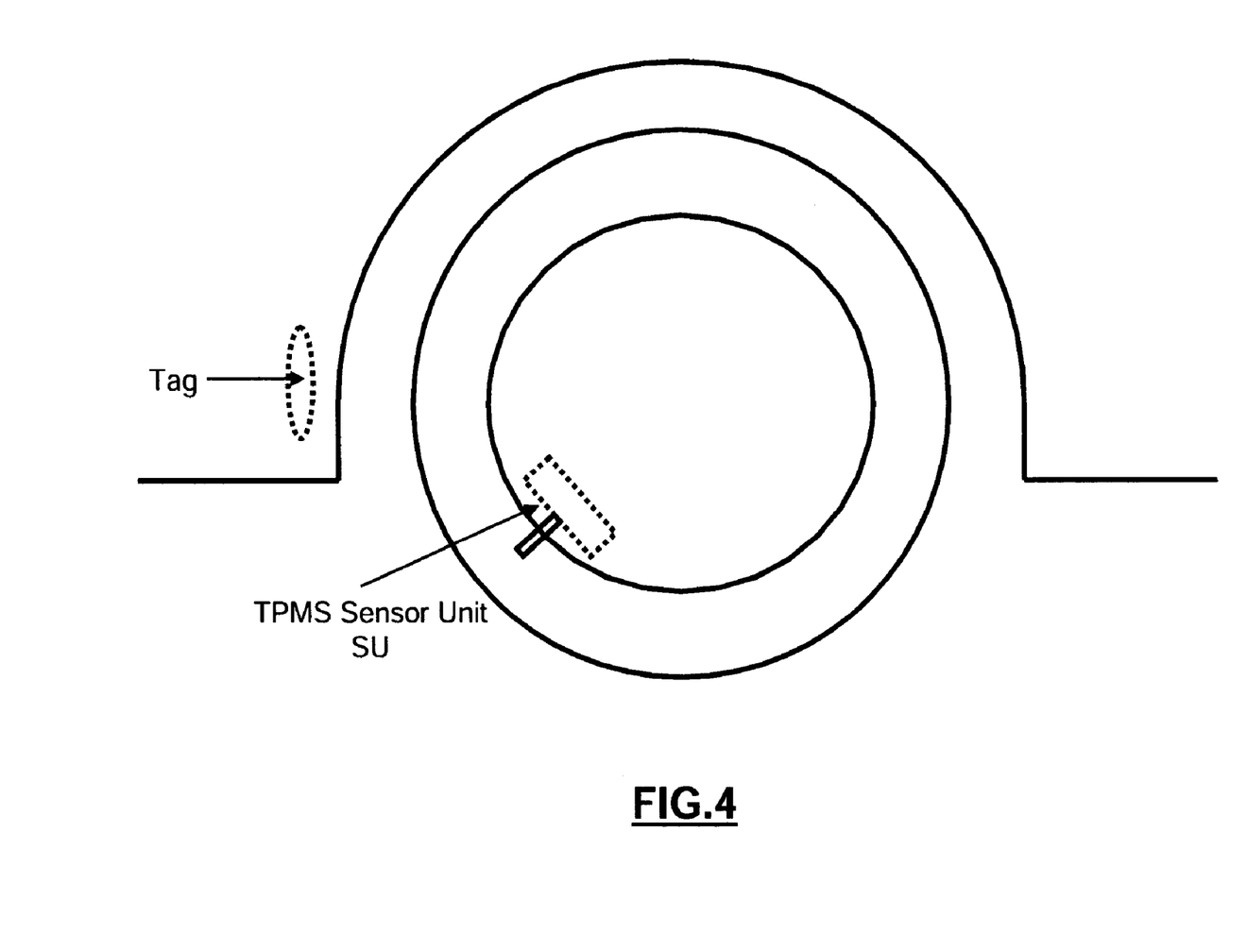
FIG. 4 is a diagrammatic side view of a wheel/tire assembly showing a sensor unit mounted on the wheel/tire assembly and the relative location of the corresponding RFID tag.

FIG. 3 is a perspective view showing a sensor unit SU and an RFID reader antenna 35 adapted to be installed in the inside of a wheel rim. As seen in this Fig., a tire parameter sensor unit SU and the antenna 35, power source 42 (not shown) and capacitor 44 (not shown) are physically mounted to the inner end of a conventional tire valve stem 50. When installed in a wheel rim, the tire valve stem 50 protrudes outwardly of the wheel rim in the usual manner. The sensor unit SU, antenna 35 power source 42, and capacitor 44 are all located within the tire. In this embodiment, antenna 35 comprises a ferrite core 52 having a coil 53 wound about the outer surface of the core 52. FIG. 4 illustrates one possible arrangement for mounting the RFID tag on the vehicle relative to the position of the sensor unit SU mounted within the wheel rim in the manner of FIG. 3. Other physical locations for the RFID tag will occur to those skilled in the art.

Figure 5:
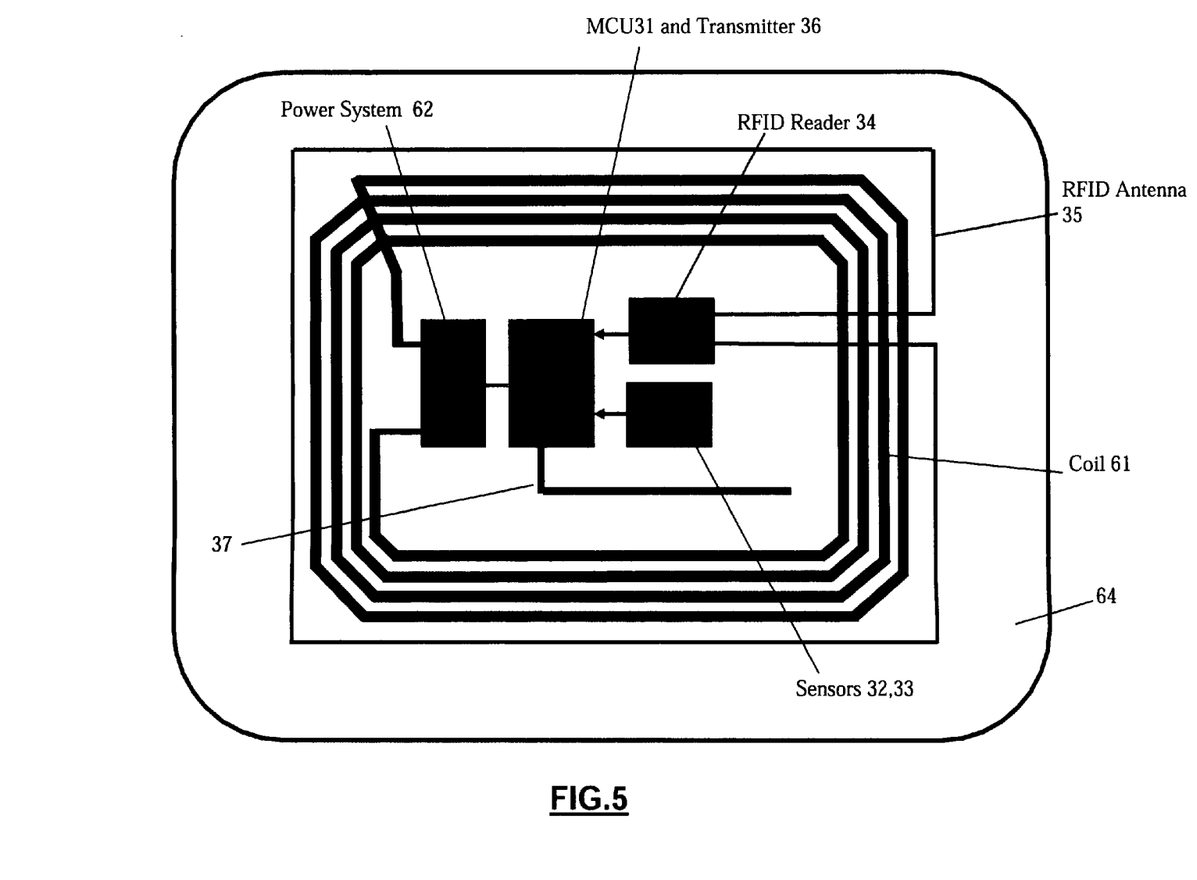
FIG. 5 is a schematic block diagram of a second embodiment of a sensor unit having an inductive power source.
Figure 6:
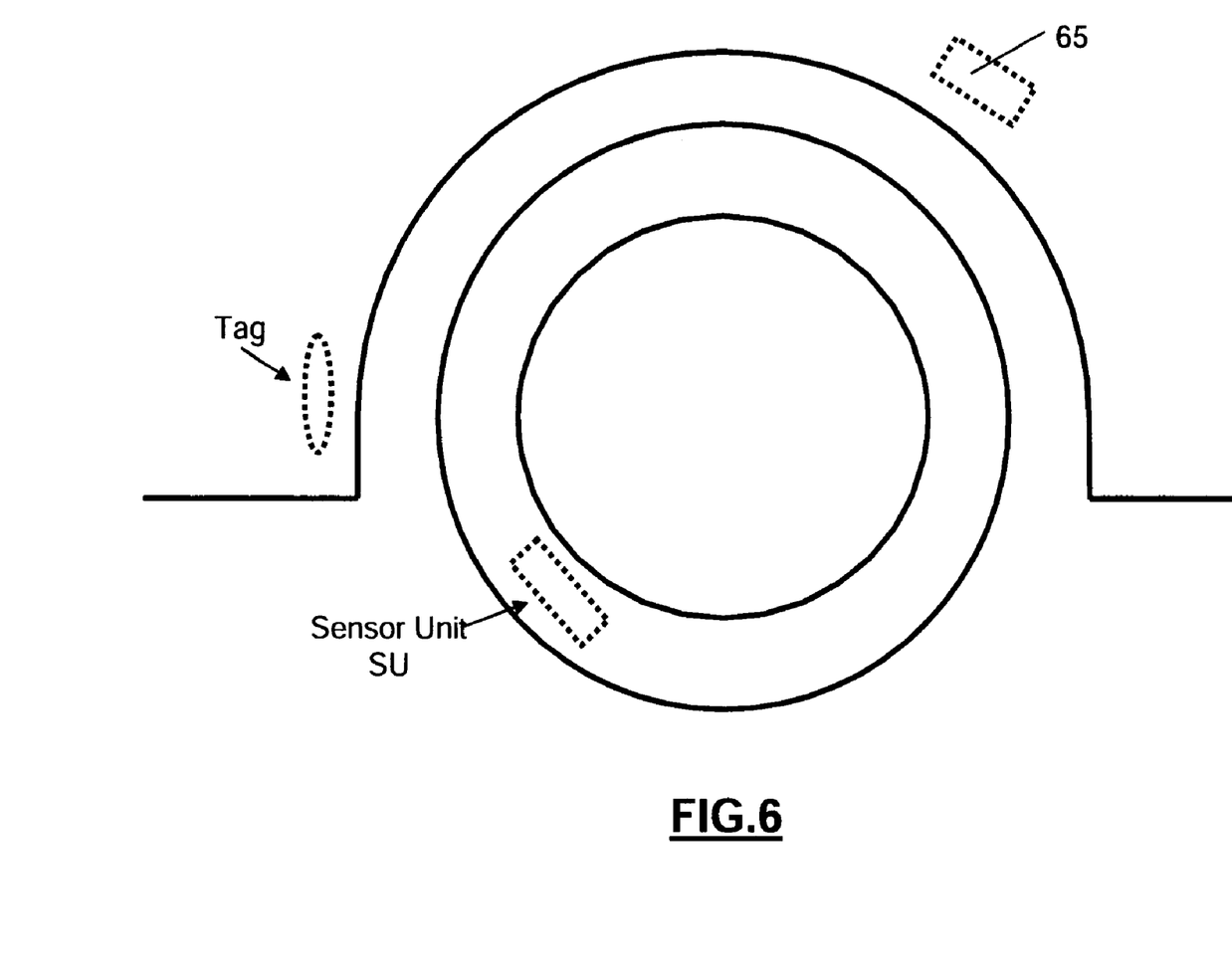
FIG. 6 is a diagrammatic side view of a wheel/tire assembly showing a FIG. 5 sensor unit mounted in the wheel/tire assembly and the relative location of the corresponding RFID tag and power magnet.

FIG. 5 is a schematic block diagram of a second embodiment of a sensor unit having an electromagnetic inductive power source. As seen in this Fig., the sensor unit includes microcontroller 31, sensors 32, 33, RFID tag reader 34, RFID tag reader antenna 35, transmitter 36, and antenna 37. In addition, the sensor unit of FIG. 5 includes a power coil 61 and a power system 62. Elements 31-37, 61 and 62 are all carried by a substrate which is preferably fabricated from a relatively thin, flexible dielectric material, such as PTFE, possessing good bonding characteristics for the system components 31-37, 61, and 62 and capable of good adhesion to the outer or inner wall surface of a vehicle tire or compatible with internal mounting within a tire side wall. Power coil 61 and power system 62 are constructed and function in a manner essentially identical to that disclosed in the above-referenced U.S. Pat. No. 7,363,806, the disclosure of which has been incorporated by reference. Briefly, power coil 61 generates electrical power from the magnetic field produced by a permanent magnet mounted on the vehicle in proximity to the sensor unit as it revolves with the wheel/tire assembly. FIG. 6 shows one such arrangement. As seen in this Fig., a permanent magnet 65 is mounted on the vehicle at a location near a wheel/tire assembly. As the wheel/tire assembly rotates, the power coil 61 in the sensor unit cuts the magnetic lines of force produced by the permanent magnet 65 and converts this magnetic energy to unregulated electrical power. Power system 62 converts this unregulated electrical power to regulated electrical power used to supply electrical power to the sensor unit SU elements requiring such power for operation. Thus, power system 62 includes a voltage multiplier, a voltage regulator and a storage capacitor to effect the necessary conversion. The embodiment of FIG. 5 offers the advantage of eliminating the battery and thus providing an inexhaustible power source for the sensor unit.

When installing a system according to the invention at the vehicle factory, the RFID tags 21-24 are mounted in their respective positions and the individual RFID tag identification codes are individually read out by suitable interrogation equipment and are programmed into the central receiver/processor 38 along with location identification information. Similarly, when installing a system according to the invention as an aftermarket item, care need only be taken that the RFID tag identification codes are individually read out by suitable interrogation equipment and are programmed into the central receiver/processor 38 along with location identification information. Once installed, re-location of tires does not affect the accuracy and reliability of the system since the location of the sensor units is irrelevant to the identification of the location of the transmitting sensor unit. Thus, a spare tire can be exchanged for a tire on the vehicle without affecting the operation of the system.

In use, one or more tire parameter sensors 32, 33 supply tire parameter electrical signals representative of the value of the sensor measurement(s) to the microcontroller unit 31. Microcontroller unit 31 combines these signals with the digital version of the RFID tag identification code and supplies these to transmitter 36. Transmitter 36 transmits these signals to central receiver processor 38, in which the received signals are processed and used to drive display/alarm unit 40. Since the received signals contain the RFID tag identification signals, the accompanying tire parameter measurement signals are correlated to the RFID tag identification signals. Since the RFID tag identification signals are correlated to vehicle location, the location of the tire whose tire parameter measurement signals have been contemporaneously received by central receiver/processor 38 is automatically known.

Interrogation of an installed sensor unit may be accomplished in a number of different ways. One such way is to program the microcontroller unit 31 to activate the RFID reader 34 each time the vehicle ignition is energized to ensure that each RFID tag is operational. If not, the microcontroller sends a message to the central processor/receiver 38 indicating the identity of the non-functioning RFID tag. This information is then displayed by display/alarm unit 40. Another technique is to program the microcontroller unit 31 to activate the RFID reader 34 on a periodic basis-e.g. every 10 minutes-during vehicle operating time. If an RFID tag fails to respond, the non-operational message is sent to the central processor/receiver 38 and displayed by display/alarm unit 40. Still another technique is to program the microcontroller unit 31 to activate the RFID reader 34 whenever a wheel/tire assembly is removed. The above techniques may be combined, if desired. Other techniques will occur to those skilled in the art.

While the preferred embodiment has been described with reference to vehicles having four running tires, the invention is not so limited. For vehicles having more than four running tires, additional RFID tags can be added at each additional wheel/tire location and their identification codes programmed into central processor/receiver 38.

As will now be apparent, the invention provides a tire parameter sensing system incorporating a sensor unit location feature which is simple and inexpensive to implement, highly reliable, and accurate. Installation of systems according to the invention can be readily done at the vehicle factory as an integral part of the manufacturing operation, or by aftermarket installers to retro-fit existing vehicles with the latest tire parameter monitoring technology. Once installed, tires can be relocated to other arbitrary locations without affecting the accuracy and reliability of the location information.

While the invention has been described with reference to particular preferred embodiments, various modifications, alternate embodiments, and equivalents may be employed, as desired. For example, other specific circuits may be used to implement microcontroller 31, RFID reader 34, antenna 35, transmitter 36, power coil 61, and power system 62, as desired. Therefore, the above should not be construed as limiting the invention, which is defined by the appended claims.

What is claimed is:

1. A sensor unit for use with a vehicle mounted tire parameter monitoring system having at least one tire parameter sensor for measuring a tire parameter of an associated vehicle tire, said sensor unit comprising:
   an RFID tag reader for sensing sensor unit location signals generated by an associated RFID tag mounted on the vehicle body adjacent the associated sensor unit, said sensor unit location signals being generated in response to an interrogation by said sensor unit RFID tag reader;
   a microcontroller coupled to said sensor unit RFID tag reader for enabling said sensor unit RFID tag reader to perform an interrogation of the associated RFID tag and for receiving and processing said sensor unit location signals and tire parameter signals from an associated vehicle tire parameter sensor;
   a signal generator controlled by said microcontroller for transmitting the processed sensor unit location signals and the tire parameter signals to a central receiver/processor so that the sensor unit location signals serve to correlate the tire parameter signals with the associated vehicle tire;
   a power source having a battery for supplying electrical power to said microcontroller and said signal generator; and
   a power management circuit selectively coupled to said battery and said RFID tag reader for storing electrical charges from said battery during a quiescent RFID tag reader operating period and for supplying the stored charges to a power input of said RFID tag reader during an active operating period thereof,
   wherein said power management circuit includes a capacitor having a charge carrying plate, and a switch means having a power input terminal coupled to said battery, a power output terminal coupled to a power input terminal of said reader, and a control input terminal for configuring said switch in at least a first operational position in which said battery is connected to said charge carrying plate, and a second operational position in which said charge carrying plate is connected to said power input terminal of said RFID to reader to supply electrical operating power thereto,
   wherein said control input terminal of said switch means is coupled to and controlled by said microcontroller.

2. The sensor unit of claim 1 further including an inductive power source for supplying electrical power to said RFID tag reader, said microcontroller, and said signal generator.

3. The sensor unit of claim 2 wherein said inductive power source includes a power coil and a power system having an input terminal coupled to said coil and an output terminal coupled to said RFID tag reader, said microcontroller, and said signal generator.

4. The sensor unit of claim 1 further including a tire parameter sensor having an output coupled to said microcontroller.

5. The sensor unit of claim 1 further including a plurality of tire parameter sensors each having an output coupled to said microcontroller for supplying a plurality of tire parameter signals to said microcontroller.

6. A tire parameter monitoring system for monitoring the current values of tire parameters of tires mounted on a vehicle, said system comprising:
   a plurality of sensor units each associated to a different tire on the vehicle, each sensor unit including an RFID tag reader for sensing RFID tag identification signals generated by an associated RFID tag mounted on the vehicle body adjacent the associated sensor unit, said RFID tag identification signals being generated in response to an interrogation by said associated RFID tag reader;
   a microcontroller coupled to the RFID tag reader for receiving and processing said RFID tag identification signals and tire parameter signals from an associated tire parameter sensor; and
   a signal generator controlled by said microcontroller for transmitting the processed location signals and the tire parameter signals to a receiving location;
   a plurality of RFID tags each having a unique identification code stored therein for generating a plurality of different identification codes each specifying the unique location on the vehicle of the corresponding RFID tag, each RFID tag being located in proximity to a different one of said plurality of sensor units,
   each said sensor unit including a power source having a battery for supplying electrical power to said microcontroller and said signal generator;
   and a power management circuit selectively coupled to said battery and said RFID tag reader for storing electrical charges from said battery during a quiescent RFID tag reader operating period and for supplying the stored charges to a power input of said RFID tag reader during an active operating period thereof, wherein each of said power management circuit includes a capacitor having a charge carrying plate, and a switch means having a power input terminal coupled to said battery, a power output terminal coupled to a power input terminal of said RFID tag reader, and a control input terminal for configuring said switch in at least a first operational position in which said battery is connected to said charge carrying plate, and a second operational position in which said charge carrying plate is connect to said power input terminal of said RFID tag reader to supply electrical operating power thereto, wherein said control input terminal of said switch means is coupled to and controlled by said microcontroller.

7. The system of claim 6 wherein each said sensor unit includes an inductive power source for supplying electrical power to said RFID tag reader, said microcontroller, and said signal generator.

8. The system of claim 7 wherein said inductive power source includes a power coil and a power system having an input terminal coupled to said coil and an output terminal coupled to said RFID tag reader, said microcontroller, and said signal generator.

9. The system of claim 6 wherein each said sensor unit further includes a tire parameter sensor having an output coupled to said microcontroller.

10. The system of claim 6 wherein at least one of said sensor units further includes a plurality of tire parameter sensors each having an output coupled to said microcontroller.

11. The system of claim 6 further including a receiver/processor for receiving and processing the sensor location signals and tire parameter signals from said sensor units.

* * * * *